US012339598B2

(12) United States Patent
Tanaka

(10) Patent No.: US 12,339,598 B2
(45) Date of Patent: Jun. 24, 2025

(54) DEVELOPING DEVICE HAVING SPACED ROTATABLE MEMBERS AND A DEVELOPER GUIDE PORTION

(71) Applicant: CANON KABUSHIKI KAISHA, Tokyo (JP)

(72) Inventor: Chihiro Tanaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/418,570

(22) Filed: Jan. 22, 2024

(65) Prior Publication Data

US 2024/0272564 A1 Aug. 15, 2024

(30) Foreign Application Priority Data

Feb. 13, 2023 (JP) ................................ 2023-020080
Jan. 12, 2024 (JP) ................................ 2024-003031

(51) Int. Cl.
*G03G 15/08* (2006.01)

(52) U.S. Cl.
CPC ..... *G03G 15/0812* (2013.01); *G03G 15/0891* (2013.01); *G03G 2215/0648* (2013.01)

(58) Field of Classification Search
USPC .......................................................... 399/284
See application file for complete search history.

(56) References Cited

U.S. PATENT DOCUMENTS

| | | | | |
|---|---|---|---|---|
| 11,846,898 B2 | 12/2023 | Tanaka | | |
| 2004/0022560 A1* | 2/2004 | Hirobe | G03G 15/0893 | 399/269 |
| 2013/0236215 A1* | 9/2013 | Ochi | G03G 15/0121 | 399/269 |
| 2013/0330107 A1 | 12/2013 | Itagaki et al. | | |
| 2017/0357188 A1* | 12/2017 | Ishizuka | G03G 21/1647 | |
| 2024/0069470 A1 | 2/2024 | Tanaka | | |

FOREIGN PATENT DOCUMENTS

| | | |
|---|---|---|
| JP | 2013-222146 A | 10/2013 |
| JP | 2013-254107 A | 12/2013 |
| JP | 2019-045678 A | 3/2019 |

* cited by examiner

*Primary Examiner* — Quana Grainger
(74) *Attorney, Agent, or Firm* — VENABLE LLP

(57) ABSTRACT

A developing device includes a first rotatable member to feed developer for developing an electrostatic latent image formed on an image bearing member, a second rotatable member opposed to the first rotatable member to carry and feed the developer for developing the electrostatic latent image, and a third rotatable member opposed to the second rotatable member to carry and feed the developer for collecting into a second chamber. A guiding portion is opposed to each of the second and third rotatable members to guide the developer, to a second feeding screw, peeled off from the third rotatable member by a repelling magnetic field. In a case that a shortest distance between the second rotatable member and the guiding portion is B [μm], and a shortest distance between the third rotatable member and the guiding portion is C [μm], the following relationship is satisfied: B+100 μm≤C.

28 Claims, 6 Drawing Sheets

DEVELOPING DEVICE HAVING SPACED ROTATABLE MEMBERS AND A DEVELOPER GUIDE PORTION

FIELD OF THE INVENTION AND RELATED ART

The present invention relates to a developing device for developing an electrostatic latent image, formed on an image bearing member, with a developer.

As the developing device, a constitution in which two developing rollers for developing the electrostatic latent image, formed on the image bearing member, with the developer are arranged side by side is proposed (Japanese Laid-Open Patent Application (JP-A) No. 2013-254107). The developing device disclosed in JP-A 2013-254107, of the two developing rollers, to a first developing roller positioned at a lower portion in the vertical direction, the developer is supplied from a supplying portion, and to a second developing roller positioned at an upper portion in the vertical direction, the developer is delivered from the first developing roller positioned at the lower portion. Then, the developer is peeled off from the second developing roller positioned at the upper portion and then is collected.

In the case of the constitution disclosed in JP-A 2013-254107, the developer is peeled off from the second developing roller by a peeling roller. Then, the developer peeled off from the second developing roller is dropped by its own weight or delivered to the peeling roller. Here, in a developer delivering step from the second developing roller to the peeling roller, of the developer on the second developing roller, a part of the developer is carried along with an air flow and is dropped on the first developing roller positioned immediately below the second developing roller by the influence of the air flow generated in a gap between the second developing roller and the peeling roller.

The developer dropped on the first developing roller is a used developer which is used in a developing step by the first developing roller and the second developing roller, and an amount of toner in the developer becomes smaller than an amount of normal toner existing in the supplying portion.

When such a used developer is dropped on the first developing roller, there is a liability that the developer enters a developer delivering portion positioned in the neighborhood of a closest position between the first developing roller and the second developing roller by the influence of a magnetic force on the first developing roller. When the used developer is delivered again to the second developing roller at the developer delivering portion between the first developing roller and the second developing roller, the developer on the second developing roller becomes a mixture of the normal developer and the used developer in which the amount of the toner is small, and therefore, non-uniformity in amount of the toner moving to the image bearing member when the electrostatic latent image on the image bearing member is developed with the developer occurs, so that density unevenness occurs on a final output image. This phenomenon is referred to as a so-called co-rotation (drag) phenomenon.

Thus, in the developing device including the two developing rollers as disclosed in JP-A 2013-254107, there is a liability that an image defect such as the density unevenness is liable to occur on the output image. Particularly, in a use condition such that an image forming apparatus is operated at a high speed, the above-described problem is liable to occur by the influence of temperature rise in the developing device.

SUMMARY OF THE INVENTION

A principal object of the present invention is to provide a developing device capable of suppressing an occurrence of an image defect.

According to an aspect of the present invention, there is provided a developing device comprising: a first chamber configured to accommodate a developer containing toner and a carrier; a first feeding screw provided in the first chamber and configured to feed the developer in the first chamber; a second chamber partitioned from the first chamber by a partition wall; a second feeding screw provided in the second chamber and configured to feed the developer in the second chamber, the second feeding screw having a rotation center positioned above a rotation center of the first feeding screw in a vertical direction; a first rotatable member to which the developer is supplied from the first chamber and configured to carry and feed the developer for developing an electrostatic latent image formed on an image bearing member; a first magnet fixedly provided inside the first rotatable member; a second rotatable member which is provided opposed to the first rotatable member, to which the developer is delivered from the first rotatable member by a magnetic field generated by the first magnet, and which is configured to carry and feed the developer for developing the electrostatic latent image, the second rotatable member having a rotation center positioned above a rotation center of the first rotatable member in the vertical direction; a second magnet fixedly provided inside the second rotatable member; a third rotatable member which is provided opposed to the second rotatable member, to which the developer is delivered from the second rotatable member by a magnetic field generated by the second magnet, and which is configured to carry and feed the developer for collecting, into the second chamber, the developer after the electrostatic latent image is developed with the developer, the third rotatable member having a rotation center positioned above the rotation center of the second rotatable member in the vertical direction; a third magnet fixedly provided inside the third rotatable member; and a guiding portion provided opposed to each of the second rotatable member and the third rotatable member and configured to guide the developer, to the second feeding screw, peeled off from the third rotatable member by a repelling magnetic field generated by the third magnet, wherein in a case that a shortest distance between the second rotatable member and the guiding portion is B [μm], and a shortest distance between the third rotatable member and the guiding portion is C [μm], the following relationship is satisfied:

$$B + 100\,\mu\text{m} \leq C.$$

Further features of the present invention will become apparent from the following description of exemplary embodiments with reference to the attached drawings.

DESCRIPTION OF THE EMBODIMENTS

An embodiment will be described using FIGS. 1 to 6. First, a general structure of an image forming apparatus in the embodiment will be described with reference to FIG. 1.

Image Forming Apparatus

Figure 1:
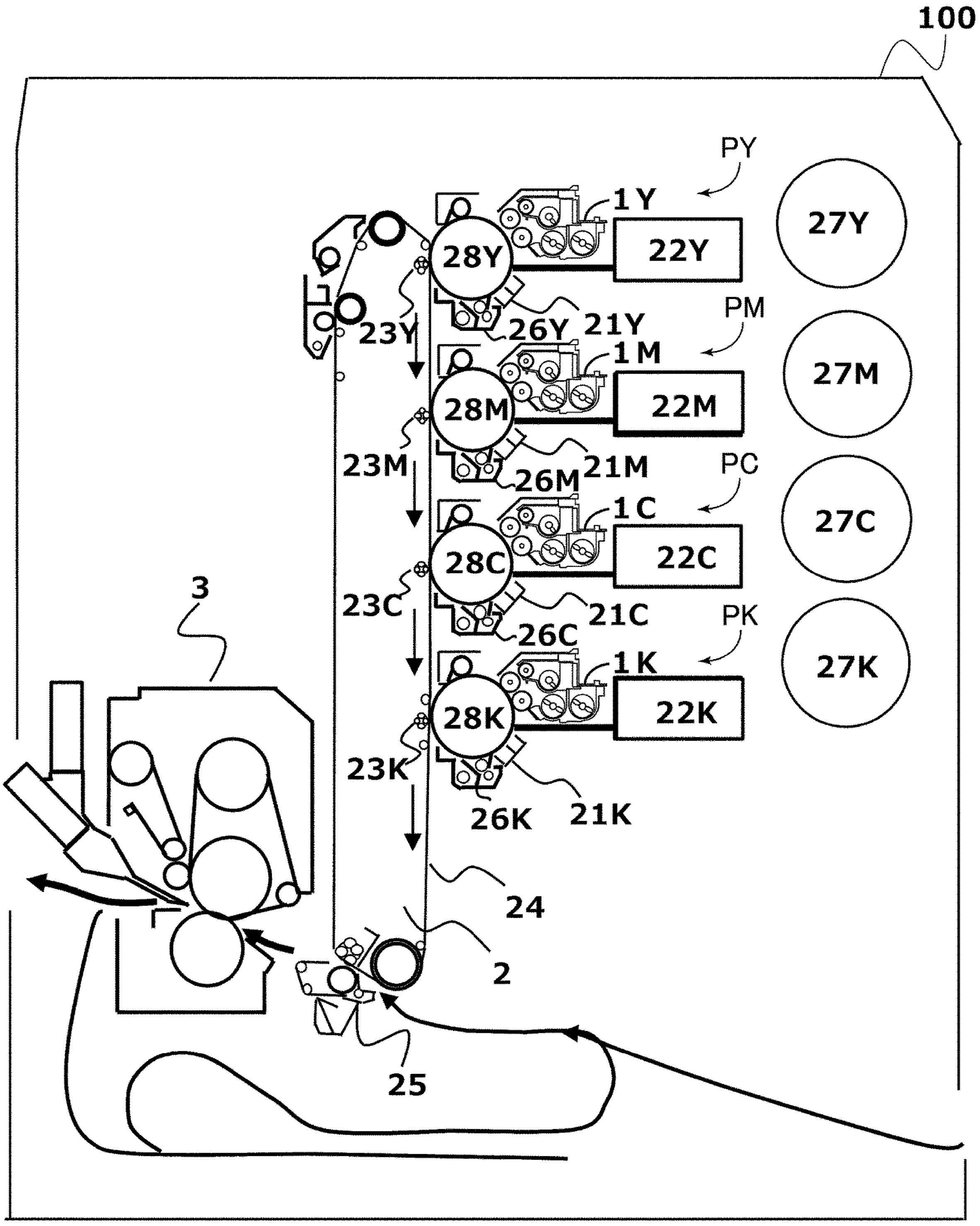
FIG. 1 is a schematic sectional view of an image forming apparatus according to an embodiment.

An image forming apparatus 100 is a full-color image forming apparatus, and in the case of this embodiment, the image forming apparatus 100 is, for example, an MFP (multi-function peripheral) having a copy function, a printer function, and a scan function. The image forming apparatus 100 includes, as shown in FIG. 1, image forming portions PY, PM, PC, and PK for performing an image forming step of forming toner images of four colors of yellow, magenta, cyan, and black, respectively, which are juxtaposed.

The image forming portions PY, PM, PC, and PK for the respective colors include primary chargers 21Y, 21M, 21C, and 21K, developing devices 1Y, 1M, 1C, and 1K, optical write portions (exposure devices) 22Y, 22M, 22C, and 22K, photosensitive drums 28Y, 28M, 28C, and 28K, and cleaning devices 26Y, 26M, 26C, and 26K, respectively. Further, the image forming apparatus 100 includes a transfer device 2 and a fixing device 3. Structures of the image forming portions PY, PM, PC, and PK are similar to each other, and therefore, in the following, description will be described using the image forming portion PY as a representative.

The photosensitive drum 28Y as an image bearing member is a photosensitive member, having a photosensitive layer formed of a resin such as polycarbonate, containing an organic photoconductor (OPC), and is constituted so as to be rotated at a predetermined speed. The primary charger 21Y includes a corona discharge pole disposed at a periphery of the photosensitive drum 28Y and electrically charges a surface of the photosensitive drum 28Y by generated ions.

In the optical write portion 22Y, a scanning optical device is assembled, and by exposing the charged photosensitive drum 28Y to light on the basis of image data, a potential of an exposed portion is lowered, so that a charge pattern (electrostatic latent image) corresponding to the image data is formed. The developing device 1Y develops the electrostatic latent image, formed on the photosensitive drum 28Y, by transferring a developer accommodated therein onto the photosensitive drum 28Y. The developer is prepared by mixing a carrier with toner of an associated color, and the electrostatic latent image is visualized (developed) with the toner.

The transfer device 2 includes primary transfer rollers 23Y, 23M, 23C, and 23K, an intermediary transfer belt 24, and a secondary transfer roller 25. The intermediary transfer belt 24 is wound around the primary transfer rollers 23Y, 23M, 23C, and 23K and a plurality of rollers, and is supported so as to be travelable.

The primary transfer rollers 23Y, 23M, 23C, and 23K are disposed in a named order from above in FIG. 1 and correspond to the colors of Y (yellow), M (magenta), C (cyan), and K (black), respectively. The secondary transfer roller 25 is disposed outside the intermediary transfer belt 24 and is constituted so that a recording material is capable of passing through between the secondary transfer roller 25 and the intermediary transfer belt 24. The recording material is a sheet such as paper or a plastic sheet.

The toner images of the respective colors formed on the photosensitive drums 28Y, 28M, 28C, and 28K are successively transferred onto the intermediary transfer belt 24 by the primary transfer rollers 23Y, 23M, 23C, and 23K, respectively, so that a color toner image including superimposed layers of the colors of yellow, magenta, cyan, and black is formed. The thus-formed toner image is transferred by the secondary transfer roller 25 onto the recording material fed from a cassette in which recording materials are accommodated. The recording material on which the toner image is transferred is pressed and heated in the fixing device 3. By this, the toner on the recording material is melted, so that the color image is fixed on the recording material.

Developer storage portions 27Y, 27M, 27C, and 27K are provided correspondingly to the developing devices 1Y, 1M, 1C, and 1K, respectively, and in which bottles accommodating developers corresponding to the colors of yellow, magenta, cyan, and black are exchangeably mounted in a named order from above, respectively. The developer storage portions 27Y, 27M, 27C, and 27K are constituted so that the developers are capable of being fed (supplied) therefrom to the developing devices 1Y, 1M, 1C, and 1K corresponding to the colors of the developers stored therein, respectively.

For example, a toner weight ratio of the developer accommodated in each bottle is 80 to 95%, and a toner weight ratio of the developer in each of the developing devices 1Y, 1M, 1C, and 1K is 5 to 10%. For that reason, when the toner is consumed by development in each of the developing devices 1Y, 1M, 1C, and 1K, the developer containing the toner in an amount corresponding to a consumption amount of the toner is supplied, so that the toner weight ratio of the developer in each of the developing devices 1Y, 1M, 1C, and 1K is maintained in a constant amount.

Developing Device

Next, the developing devices 1Y, 1M, 1C, and 1K will be specifically described using FIGS. 2 to 5.

Figure 2:
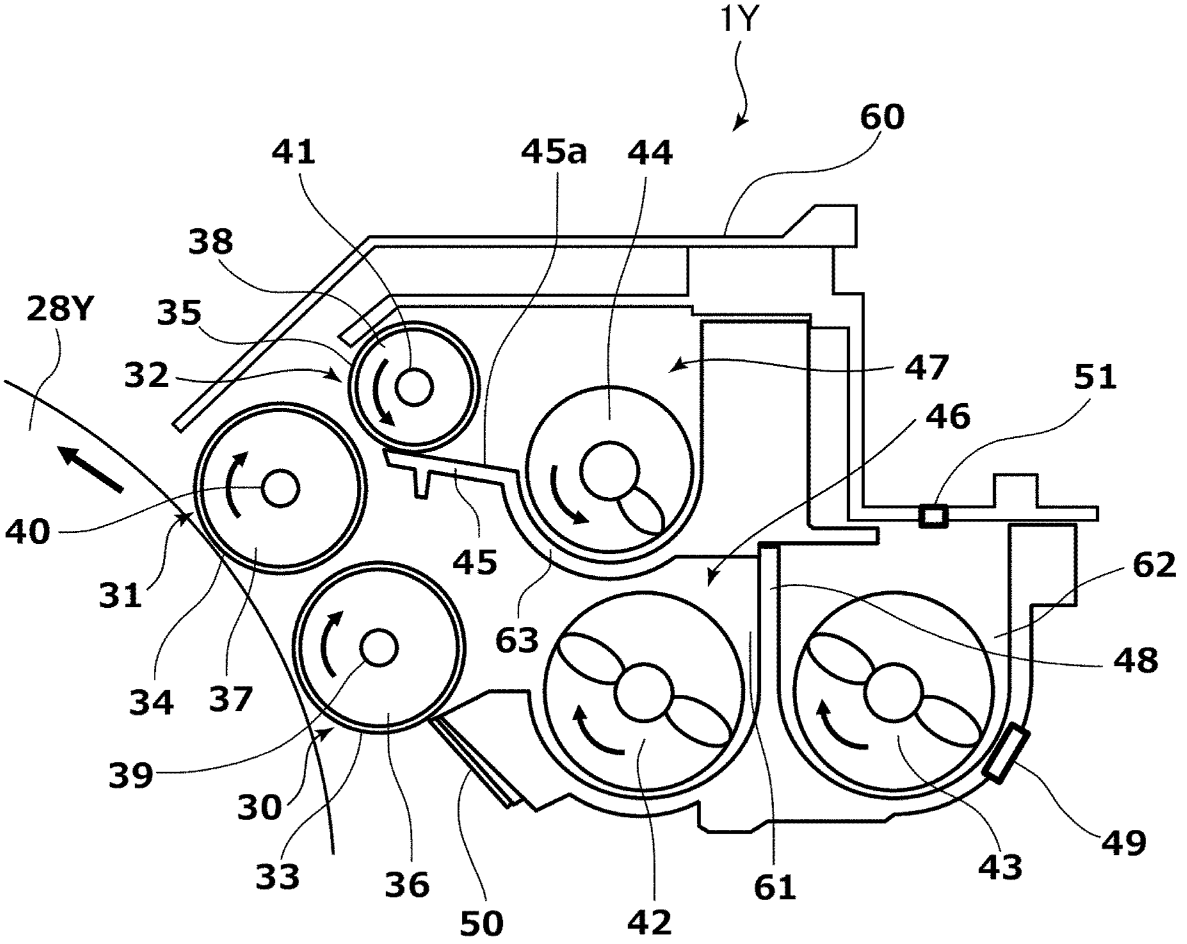
FIG. 2 is a schematic sectional view of a developing device according to the embodiment.

Structures of the developing devices 1Y, 1M, 1C, and 1K are the same, and therefore, in the following, the developing device 1Y will be described as a representative. FIG. 2 is a conceptual view illustrating the developing device 1Y shown in FIG. 1, and FIGS. 3 to 5 are conceptual views illustrating magnetic pole structures of a first magnet 36, a second magnet 37, and a third magnet 38 which are provided inside the developing device 1Y, respectively.

The developing device 1Y includes, as shown in FIG. 2, a first developing roller 30, a second developing roller 31, a peeling roller 32, a developer supplying screw 42, a developer stirring screw 43, and a developer collecting screw 44, and these members are accommodated in a developing container 60.

The first developing roller 30 is a developer carrying member which is rotationally driven, and is provided at a position adjacent to the photosensitive drum 28Y so that a rotational axis thereof is substantially parallel to a rotational axis of the photosensitive drum 28Y. The first developing roller 30 includes a first sleeve 33 which is rotatable, and the first magnet (fixed magnet) 36 non-rotationally provided inside the first sleeve 33 and for attracting the developer to a surface of the first sleeve 33 by a magnetic force. Then, the first developing roller 30 attracts (carries) the developer, scooped from the developer supplying screw 42, on the basis of the magnetic force, and develops the electrostatic latent image formed on the rotating photosensitive drum 28Y (image bearing member), with the developer.

The first sleeve 33 is a non-magnetic cylindrical member and is rotationally driven about a rotation shaft 39. A rotational direction of the first sleeve 33 is the clockwise direction as indicated by an arrow in FIG. 2 and is a direction opposite to a rotational direction of the photosensitive drum 28. For this reason, the first sleeve 33 and the photosensitive drum 28Y rotate in the same direction at mutually opposing positions.

Figure 3:
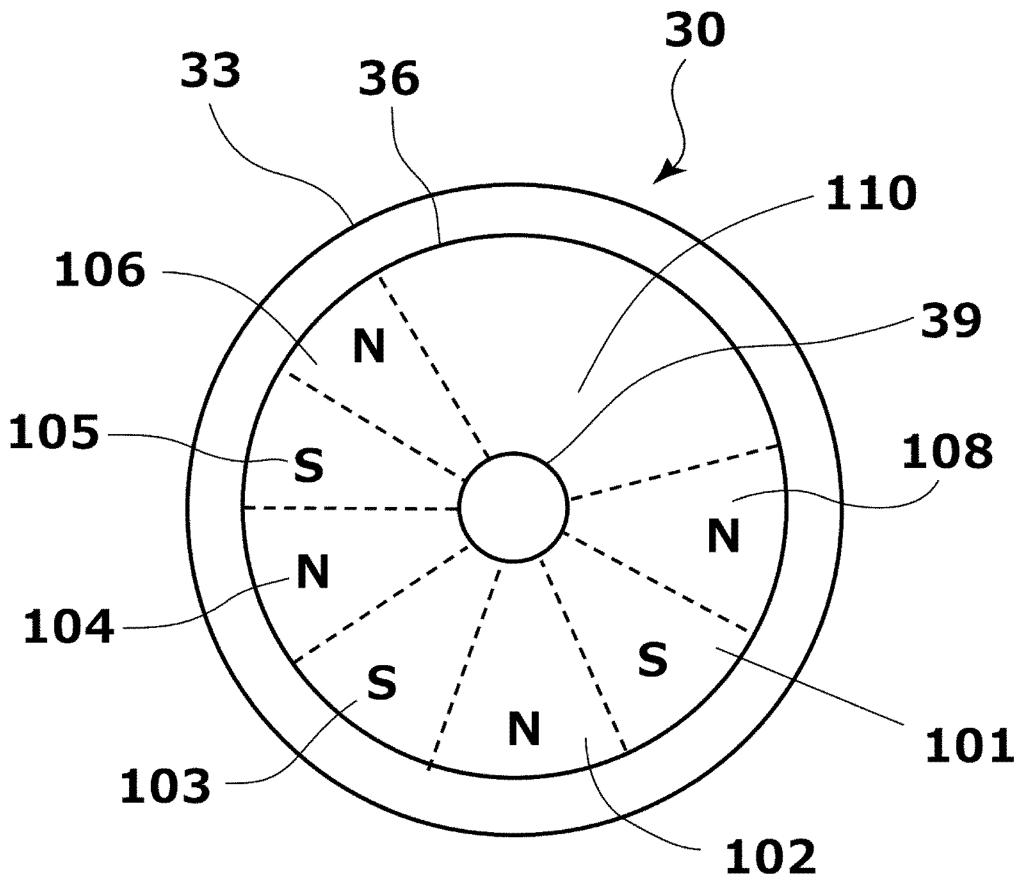
FIG. 3 is a schematic view showing a magnetic pole arrangement of a first developing roller in the embodiment.

The first magnet 36 is disposed inside the first sleeve 33 and includes, as shown in FIG. 3, a plurality of sector magnetic poles 101 to 107 and a sector non-magnetic pole portion 110. Between an inner periphery of the first sleeve 33 and an outer periphery of the first magnet 36, a space permitting rotation of the first sleeve 33 is provided.

The developer attracted onto the first sleeve 33 is conveyed toward the photosensitive drum 28Y by a rotation operation of the first sleeve 33, so that the electrostatic latent image formed on the photosensitive drum 28Y is developed with the developer. After the electrostatic latent image formed on the photosensitive drum 28Y is developed with the developer, the developer on the first sleeve 33 is conveyed to the neighborhood of the second developing roller 31 by a rotation operation of the first sleeve 33. Then, in the neighborhood of a closest position between the first developing roller 30 and the second developing roller 31, the developer is peeled off from the first sleeve 33 and then delivered to a surface of a second sleeve 34 by a magnetic field generated by the first magnet 36 included in the first developing roller 30 and by the second magnet 37 included in the second developing roller 31.

The second developing roller 31 is a developer carrying member which is rotationally driven, and is provided downstream of the first developing roller 30 with respect to the rotational direction of the photosensitive drum 28Y and above a rotation center of the first developing roller 30 with respect to the vertical direction. To the second developing roller 31, the developer is delivered from the first developing roller 30 by the magnetic force. The second developing roller 31 is, similarly as the first developing roller 30, provided at a position adjacent to the photosensitive drum 28Y so that a rotational axis thereof is substantially parallel to a rotational axis of the photosensitive drum 28Y. Accordingly, the second developing roller 31 and the first developing roller 30 are substantially parallel to each other in rotational axis.

Such a second developing roller 31 includes a second sleeve 34 which is rotatable, and the second magnet (fixed magnet) 37 non-rotationally provided inside the second sleeve 34 and for attracting the developer to a surface of the second sleeve 34 by a magnetic force. Then, on the basis of the magnetic force, to the second developing roller 31, the developer is delivered from the first developing roller 30 (the first sleeve 33), and the second developing roller 31 attracts (carries) the developer, and develops the electrostatic latent image formed on the rotating photosensitive drum 28Y, with the developer. On a side of the second developing roller 31, the peeling roller 32 described later is positioned.

The second sleeve 34 is a non-magnetic cylindrical member and is rotationally driven about a rotation shaft 40. A rotational direction of the second sleeve 34 is the clockwise direction as indicated by an arrow in FIG. 2 and is a direction opposite to a rotational direction of the photosensitive drum 28. For this reason, the second sleeve 34 and the photosensitive drum 28Y rotate in the same direction at mutually opposing positions. Further, the first sleeve 33 and the second sleeve 34 rotate in opposite directions at mutually opposing positions.

Figure 4:
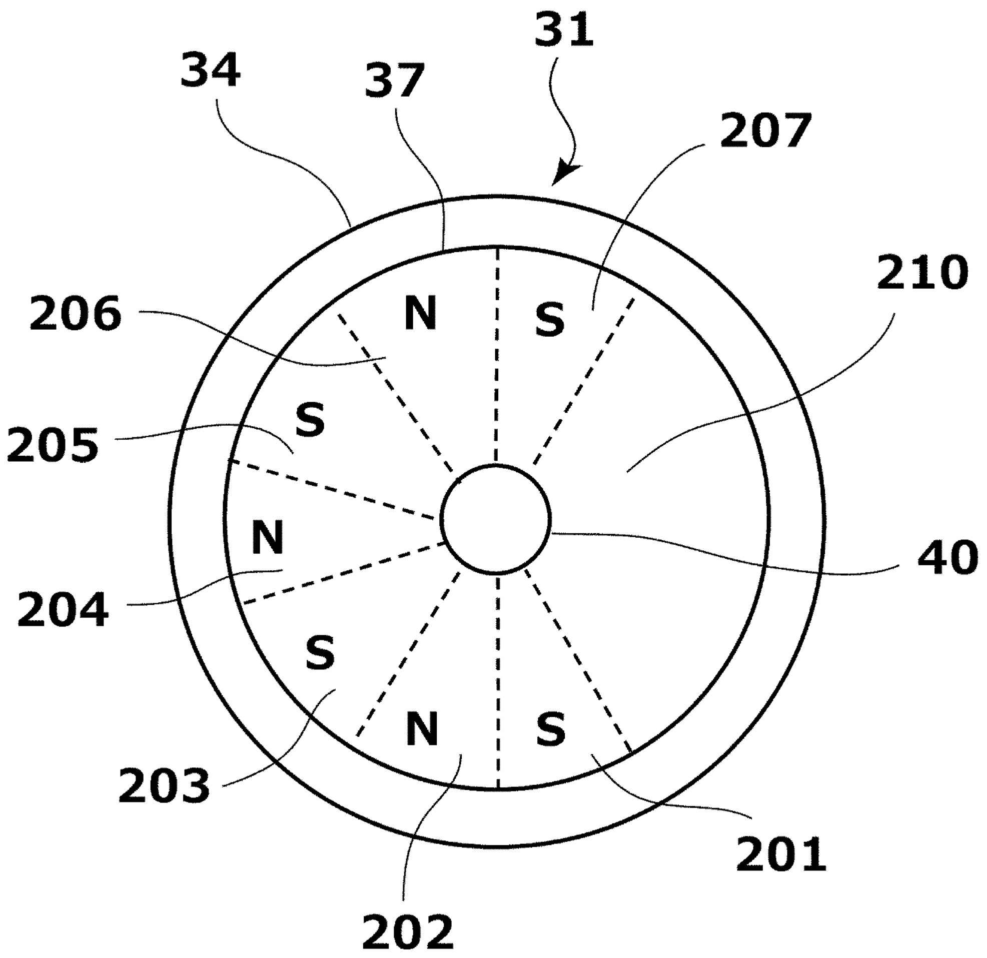
FIG. 4 is a schematic view showing a magnetic pole arrangement of a second developing roller in the embodiment.

The second magnet 37 is disposed inside the second sleeve 34 and includes, as shown in FIG. 4, a plurality of sector magnetic poles 201 to 207 and a sector non-magnetic pole portion 210. Between an inner periphery of the second sleeve 34 and an outer periphery of the second magnet 37, a space permitting rotation of the second sleeve 34 is provided.

The developer attracted onto the second sleeve 34 is conveyed toward the photosensitive drum 28Y by a rotation operation of the second sleeve 34, so that the electrostatic latent image formed on the photosensitive drum 28Y is developed with the developer. After the electrostatic latent image formed on the photosensitive drum 28Y is developed with the developer, the developer remaining on the second sleeve 34 is conveyed to the neighborhood of the peeling roller 32 by a rotation operation of the second sleeve 34. Then, in the neighborhood of a closest position between the second developing roller 31 and the peeling roller 32, the developer is delivered from the second sleeve 34 to a third sleeve 35 of the peeling roller 32 by a magnetic field generated by the second magnet 37 included in the second developing roller 31 and by the third magnet 38 included in the peeling roller 32.

The peeling roller 32 as a peeling portion is provided on a side opposite from the photosensitive drum 28Y with respect to a rotation center R (see FIG. 6 described later) of the second sleeve 34 and peels off, from the second developing roller 31, the developer after the electrostatic latent image on the photosensitive drum 28Y is developed by the second developing roller 31. Specifically, the peeling roller 32 is a developer carrying member which is rotationally driven, and is provided between the second developing roller 31 and the developer collecting screw 44 so that a rotation center thereof is positioned above the rotation center R of the second developing roller 31.

Further, the peeling roller 32 is disposed so that a rotational axis thereof is substantially parallel to a rotational axis of the second developing roller 31. Such a peeling roller 32 includes a third sleeve 35 which is rotatable, and the third magnet (fixed magnet) 38 non-rotationally provided inside the third sleeve 35 and for attracting the developer to a surface of the third sleeve 35 by a magnetic force, and is constituted so that the developer is delivered from the second developing roller 31 thereto on the basis of the magnetic force.

The third sleeve 35 is a non-magnetic cylindrical member and is rotationally driven about a rotation shaft 41. A rotational direction of the third sleeve 35 is the counterclockwise direction as indicated by an arrow in FIG. 2 and is a direction opposite to a rotational direction of the second sleeve 34. For this reason, the third sleeve 35 and the second sleeve 34 rotate in the same direction at mutually opposing positions.

Figure 5:
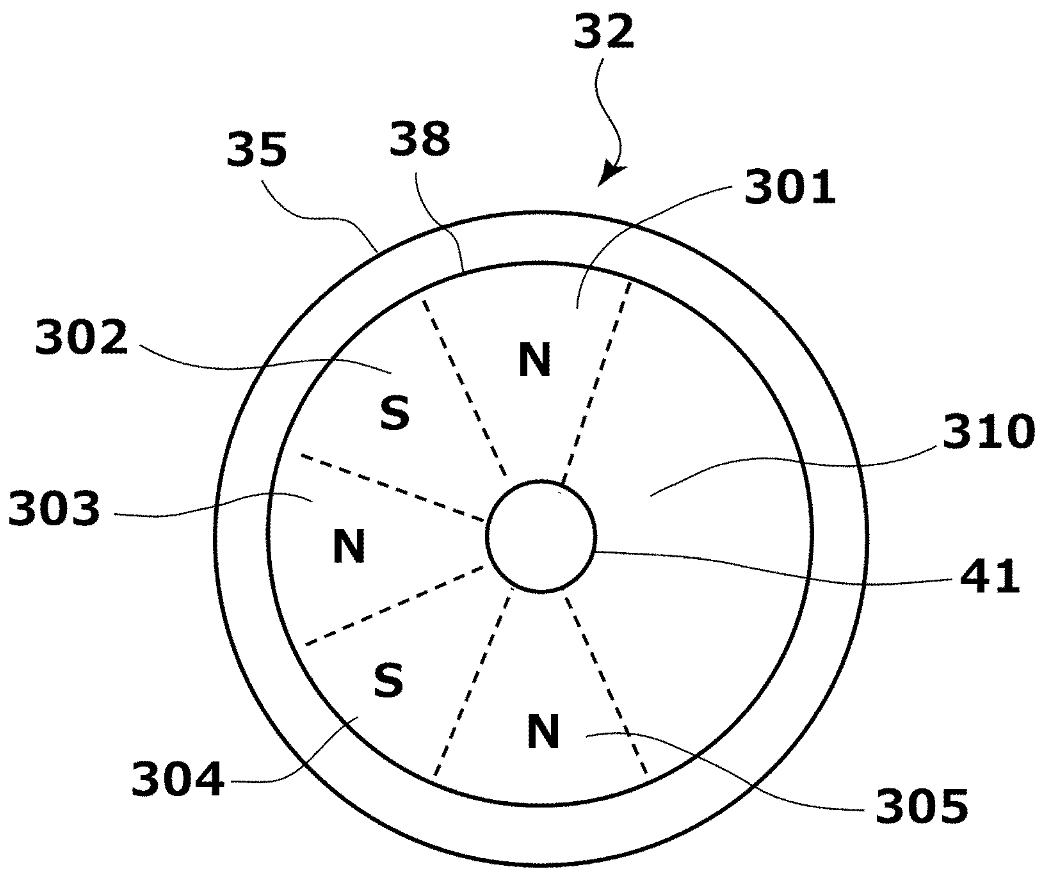
FIG. 5 is a schematic view showing a magnetic pole arrangement of a peeling roller in the embodiment.

The third magnet 38 is disposed inside the third sleeve 35 and includes, as shown in FIG. 5, a plurality of sector magnetic poles 301 to 305 and a sector non-magnetic pole portion 310. Between an inner periphery of the third sleeve 35 and an outer periphery of the third magnet 38, a space permitting rotation of the third sleeve 35 is provided.

The developer attracted to the third sleeve 35 is conveyed to a downstream side of the rotational direction by a rotation operation of the third sleeve 35 and is peeled off from the third sleeve 35 at a position close to the developer collecting screw 44 by the third magnet 38 included in the peeling roller 32, so that the developer is dropped toward a guiding member 45 positioned below with respect to the vertical direction, by a self-weight thereof. Then, the developer dropped on the guiding member 45 is guided toward the developer collecting screw 44 by its own weight.

The guiding member 45 and the developer collecting screw 44 constitute a developer collecting portion 47 as a collecting portion for collecting the developer peeled off from the third sleeve 35 on the peeling roller 32. In the developer collecting portion 47, the developer collecting screw 44 is positioned below a rotation center of the peeling roller 32 in the vertical direction, and conveys the developer delivered (collected) from the peeling roller 32, while stirring the developer.

The guiding member 45 as a guiding portion is disposed below the rotation center of the peeling roller 32 with respect to the vertical direction, and guides the developer, peeled off by the peeling roller 32, toward the developer collecting screw 44. Such a guiding member 45 is provided with an inclined surface 45*a* along which the developer slides down by its own weight in order to reliably guide the peeled developer toward the developer collecting screw 44. The inclined surface 45*a* is inclined with respect to a horizontal direction so that a position thereof on the developer collecting screw 44 side is lower than a lower position of the peeling roller 32.

In an attitude of the developing device 1Y when the developing device 1Y is mounted in the image forming apparatus 100, it is assumed that the developing device 1Y is viewed in a cross section perpendicular to a rotational axis of the peeling roller 32. At this time, of two intersection points where a horizontal line L passing through the rotation center of the peeling roller 32 crosses the peeling roller 32, the point on a side closer to a rotation center of the developer collecting screw 44 is an intersection point X, and the point on a side further remote from the rotation center of the developer collecting screw 44 is an intersection point X' (see FIG. 2 and FIG. 6 described later). Further, at this time, a tangential line of the peeling roller 32 passing through the intersection point X is a tangential line M, a perpendicular line passing through a lowest point Y of the inclined surface 45*a* of the guiding member 45 is a perpendicular line H, and a perpendicular line passing through a free end Z of the guiding member 45 is a perpendicular line N (see FIG. 6 described later). At this time, as a positional relationship between the peeling roller 32 and the guiding member 45, setting is made so that the tangential line M crosses the inclined surface 45*a* of the guiding member 45, while the perpendicular line H does not cross the peeling roller 32 (see FIG. 6 described later). Further, as a positional relationship between the peeling roller 32 and the guiding member 45, setting is made so that the perpendicular line N crosses a magnetic pole 304 of the third magnet 38 included in the peeling roller 32 (see FIGS. 5 and 6 described later).

In this embodiment, in order to suppress that the developer splashed by rotation of the developer collecting screw 44 is drawn by the peeling roller 32, positions of the peeling roller 32 and the developer collecting screw 44 are spaced from each other to some extent (see FIG. 2). On the other hand, in this embodiment, the positional relationships between the peeling roller 32 and the guiding member 45 are set as described above, so that even when a constitution in which the positions of the peeling roller 32 and the developer collecting screw 44 are spaced from each other is employed, the guiding member 45 is capable of reliably guiding, toward the developer collecting screw 44, the developer peeled off from the peeling roller 32.

The developer collecting screw 44 as a collecting member and a conveying feeding) portion conveys the collected developer to a developer circulating portion 46 described below. That is, the developer collecting screw 44 is a screw convey or member used for conveying the developer, collected by being slid down along the inclined surface 45*a* of the guiding member 45, in one direction while stirring the developer.

The developer circulating portion 46 is a supplying portion for supplying the developer to the first developing roller 30, and includes a regulating member 50, the developer supplying screw 42, and the developer stirring screw 43. In the developer circulating portion 46, the developer is supplied to the first developing roller 30 while the developer is conveyed in the substantially horizontal direction while being stirred in the developer supplying screw 42 and the developer stirring screw 43. Further, as described above, the developer collected by the developer collecting portion 47 is dropped by its own weight and is guided to the developer circulating portion 46. That is, the developer circulating portion 46 is positioned below the developer collecting portion 47 with respect to the vertical direction.

The developer supplying screw 42, the developer stirring screw 43, and the developer collecting screw 44 are screw conveyor members for conveying the developer in one direction while stirring the developer, and the developer supplying screw 42 and the developer stirring screw 43 are positioned below the developer collecting screw 44 with respect to the vertical direction. Further, the developer supplying screw 42, the developer stirring screw 43, and the developer collecting screw 44 are disposed so that their rotational axes are substantially parallel to each other. The rotational axes of these screws are also substantially parallel to the rotational axis of the first developing roller 30.

The developer supplying screw 42 is positioned between the first developing roller 30 and the developer stirring screw 43, and between itself and the developer stirring screw 43, a partition wall 48 of the developing container 60 is provided. The partition wall 48 of the developing container 60 is extended along rotational axis directions of the developer supplying screw 42 and the developer stirring screw 43. The partition wall 48 is provided with a communication opening (not shown) for establishing communication between a first feeding path 61 along which the developer is fed by the developer supplying screw 42 and a second feeding path 62 along which the developer is fed by the developer stirring screw 43.

The developer stirred by the developer collecting screw 44 passes through a communication opening (not shown) formed in a partition wall 63 of the developing container 60 positioned between the developer collecting screw 44 and the developer supplying screw 42 and then is dropped toward the developer supplying screw 42 by its own weight. The above-described guiding member 45 is formed integrally with the partition wall 63, and above the partition wall 63, the developer collecting screw 44 is disposed. A position of the communication opening through which the developer stirred by the developer collecting screw 44 is dropped by its own weight and is guided into the developer circulating portion 46 may preferably be disposed while avoiding a region (an intermediary portion with respect to the developer supplying screw 42) in which the developer is supplied toward the first developing roller 30. In this embodiment, the position of the communication opening is a position where the communication opening position is included in a range of a downstream end portion (terminal portion) with respect to a developer feeding direction of the first feeding path 61 in which the developer supplying screw 42 is disposed.

Developer feeding directions of the developer supplying screw 42 and the developer stirring screw 43 are mutually opposite directions. Further, a starting end side (upstream end side in the developer feeding direction) and a terminal end side (downstream end side in the developer feeding direction) of the first feeding path 61 in which the developer supplying screw 42 is disposed, and a terminal end side and a starting end side of the second feeding path 62 in which the developer stirring screw 43 is disposed communicate with each other, respectively, via communication openings provided in the partition wall 48. Accordingly, the developer is circulated in the rotational directions of the developer supplying screw 42 and the developer stirring screw 43 indicated by arrows in FIG. 2 and in the substantially horizontal direction in the developing container 60, so that a part of the developer is supplied toward the first developing roller 30.

A developer supply opening 51 (see FIG. 2) is provided above the developer stirring screw 43 in the developing container 60 and is connected to the developer storage portion 27Y (see FIG. 1). Further, the developer supply opening 51 is constituted so as to be capable of supplying the developer, accommodated in a bottle mounted in the developer storage portion 27Y, to the second feeding path 62 in which the developer stirring screw 43 is disposed.

As described above, above, a toner weight ratio of the developer accommodated in the bottle of the developer storage portion 27Y is larger than a toner weight ratio of the developer in the developing device 1Y, and therefore, by adjusting an amount of the developer supplied to the developer stirring screw 43, the toner weight ratio of the developer in the developing device 1Y can be maintained at a certain level.

A toner concentration detecting sensor 49 (see FIG. 2) is provided for detecting a toner concentration of the developer contained in the developer circulating portion 46. The toner concentration detecting sensor 49 is a sensor for detecting (magnetic) permeability. The toner concentration corresponds to a consumption amount of the toner in the developing device 1Y, and therefore, is utilized in control of supply of the developer from the developer storage portion 27Y. For example, when the toner concentration is detected that the toner concentration is lowered than a predetermined value, the developer is supplied from the developer storage portion 27Y. The permeability changes depending on the toner concentration, and therefore, by utilizing the permeability, it is possible to detect the toner concentration.

The regulating member 50 is disposed adjacent to the first developing roller 30 and is used for regulating an amount of the developer supplied from the developer circulating portion 46 to the first developing roller 30. The regulating member 50 can be constituted so as to regulate an amount of the developer attracted to the first developing roller 30, on the basis of a gap between the surface of the first sleeve 33 of the first developing roller 30 and an end portion of the regulating member 50.

A circulating path of the developer in the developing container 60 is such that the developer is fed in the substantially horizontal direction while being stirred in the developer circulating portion 46 and thereafter is supplied to the first developing roller 30, and then is delivered from the first developing roller 30 to the second developing roller 31 positioned above the first developing roller 30, on the basis of the magnetic force. Then, the developer is delivered from the second developing roller 31 to the peeling roller 32 positioned beside the second developing roller 31, on the basis of the magnetic force again, and thereafter, is peeled off from the peeling roller 32 by the third magnet 38 included in the peeling roller 32, and thereafter, the developer is collected by the developer collecting portion 47 and then is guided again into the developer circulating portion 46.

Further, as described above, in this embodiment, a two-component development type is used as a development type, and as the developer, a developer obtained by mixing non-magnetic toner having a negative charging property with a carrier having a magnetic property is used. The non-magnetic toner is toner obtained by containing a colorant, a wax component, and the like in a resin such as polyethylene or styrene-acrylic resin, by forming the mixture in powder through pulverization or polymerization, and then by adding fine powder of titanium oxide, silica, or the like to a surface the powder. The magnetic carrier is a carrier obtained by coating a resin material on a surface layer of a core comprising resin particles obtained by kneading ferrite particles or magnetic powder. The toner concentration in the developer (a weight ratio of the toner to the developer) in an initial state is 8% in this embodiment.

In general, the two-component development type using the toner and the carrier has a feature such that stress exerted on the toner is less than stress exerted on the toner in a one-component development type using a one-component developer because the toner and the carrier are charged to predetermined polarities by subjecting the toner and the carrier to triboelectric contact. A surface area of the carrier in the developer is larger than a surface area of the toner in the developer, so that a degree of carrier contamination with the toner deposited on the carrier surface is also small. However, by long-term use, an amount of a contaminant (spent) deposited on the carrier surface increases, and therefore, toner charging capacity gradually lower. As a result, problems of a fog and a toner scattering arise. Although an amount of the carrier accommodated in the developing device is increased in order to prolong a lifetime of the two-component developing device, this causes upsizing of the developing device, and therefore is not desirable.

In order to solve the above-described problems on the two-component developer, in this embodiment, an ACR (auto carrier refresh) type is employed. The ACR type is a type such that an increase in amount of a deteriorated developer is suppressed by not only supplying a fresh developer little by little from the developer storage portion 27Y into the developing device 1Y but also discharging the developer, deteriorated in charging performance, little by little through a discharge opening (not shown) of the developing device 1Y. By this, the deteriorated carrier in the developing device 1Y is replaced with a fresh carrier, so that the charging performance of the carrier in the developing device 1Y can be maintained at an approximately constant level.

Magnetic Poles of Magnets

Next, magnetic pole constitutions of the first magnet 36, the second magnet 37, and the third magnet 38 included in the first developing roller 30, the second developing roller 31, and the peeling roller 32, respectively, which are shown in FIGS. 3, 4, and 5, respectively, will be described.

As shown in FIG. 3, the first magnet 36 included in the first developing roller 30 is provided with a plurality of magnetic poles 101, 102, 103, 104, 105, 106, and 108. The magnetic poles 101 to 106 and 108 are disposed in a named order in the rotational direction of the first sleeve 33.

The magnetic pole 106 is a magnetic pole for delivering the developer from the first sleeve 33 to the second sleeve 34 by a magnetic field generated in cooperation with the second magnet 37 of the second developing roller 31. Further, in this embodiment, with respect to a rotational direction of the first sleeve 33, at a position adjacent to a downstream side of the magnetic pole 106, a non-magnetic pole portion 110 as a low magnetic force portion lower in magnetic force than the magnetic pole 106 is provided. Further, the magnetic pole 108 is disposed at a position adjacent to the downstream side of the non-magnetic pole portion 110 with respect to the rotation direction of the first sleeve 33. The non-magnetic pole portion 110 does not have the magnetic force, but may also be a magnetic pole low in magnetic force and, for example, a magnetic pole of which a magnetic force is 5 mT or less. This is true for non-magnetic pole portions 210 and 310.

Further, the magnetic pole 101 is an S pole and is used for attracting the developer, supplied from the developer supplying screw 42, to the first sleeve 33. The magnetic poles 102, 103, 104, and 105 are an N pole, an S pole, an N pole, and an S pole and are used for feeding upward the developer attracted by the magnetic pole 101 with rotation of the first sleeve 33. The magnetic pole 106 is an N pole and delivers the developer from the first sleeve 33 to the second sleeve 34 opposing the first sleeve 33 by a magnetic field generated in cooperation with a magnetic pole 201 in the second magnet 37 included in the second developing roller 31 as described above.

As shown in FIG. 4, the second magnet 37 included in the second developing roller 31 is provided with a plurality of magnetic poles 201, 202, 203, 204, 205, 206, and 207. The magnetic poles 201 to 207 are disposed in a named order in the rotational direction of the second sleeve 34.

The magnetic pole 201 is a magnetic pole for attracting the developer from the first sleeve 33 to the second sleeve 34 by a magnetic field generated in cooperation with the magnetic pole 106 of the first magnet 36 of the first developing roller 30. The magnetic pole 207 is a magnetic pole for delivering the developer from the second sleeve 34 to the third sleeve 35 by a magnetic field generated in cooperation with the third magnet 38 of the peeling roller 32.

Further, the magnetic pole 201 is an S pole and is used for attracting the developer from the first developing roller 30 (first sleeve 33) to the second sleeve 34 as described above. The magnetic poles 202, 203, 204, 205 and 206 are an N pole, an S pole, an N pole, an S pole, and an N pole and are used for feeding upward the developer attracted by the magnetic pole 201 with rotation of the second sleeve 34. The magnetic pole 207 is an S pole and delivers the developer, after passing through a developing region of the photosensitive drum 28Y corresponding to the magnetic pole 203, from the second sleeve 34 to the third sleeve 35 opposing the second sleeve 34 by a magnetic field generated in cooperation with a magnetic pole 303 in the third magnet 38 included in the peeling roller 32.

As shown in FIG. 5, the third magnet 38 included in the peeling roller 32 is provided with a plurality of magnetic poles 301, 302, 303, 304, and 305. The magnetic poles 301 to 305 are disposed in a named order in the rotational direction of the third sleeve 35.

The magnetic pole 303 is an N pole and is used for attracting the developer, peeled off from the second sleeve 34 as described above, to the third sleeve 35. The magnetic poles 301, 302, and 304 are an N pole, an S pole, and an S pole and are used for feeding the developer on the third sleeve 35 with rotation of the third sleeve 35. Particularly, the magnetic pole 304 is used for feeding downward the developer attracted by the magnetic pole 303 with rotation of the third sleeve 35. The magnetic pole 305 is an N pole and is peeling pole used for peeling off the developer, attracted to the third sleeve 35, from the third sleeve 35 by a repelling magnetic field generated in cooperation with the magnetic pole 301 having the same pole.

Structure of Periphery of Second Developing Roller and Peeling Roller

Figure 6:
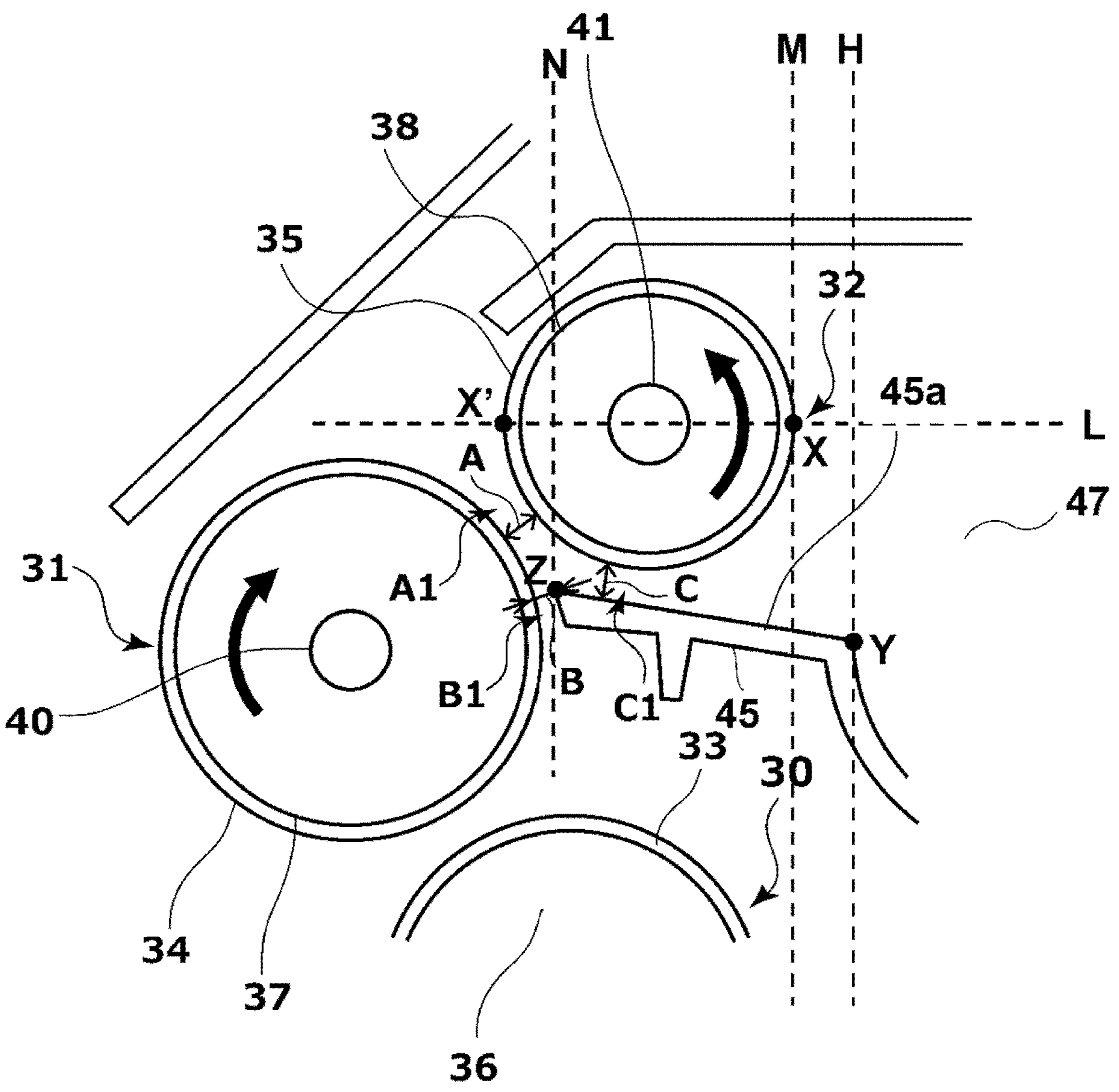
FIG. 6 is an enlarged view of a periphery of the second developing roller and the peeling roller in the embodiment.

Next, referring to FIG. 6, a structure of a periphery of the second developing roller 31 and the peeling roller 32 will be described.

In this embodiment, the developer in the developing device 1Y moves from the surface of the first sleeve 33 of the first developing roller 30 to the surface of the second sleeve 34 of the second developing roller 31, and moves to the surface of the third sleeve 35 of the peeling roller 32 after being used in a developing step of the electrostatic latent image on the photosensitive drum 28Y. In recent years, speed-up of the image forming apparatus advances, so that rotational speeds of the first developing roller 30, the second developing roller 31, and the peeling roller 32 become fast. For this reason, when the developer moves from the surface of the second sleeve 34 of the second developing roller 31 to the surface of the third sleeve 35 of the peeling roller 32, an air flow generates in a gap A1 between the second developing roller 31 and the peeling roller 32, so that a part of the developer on the second sleeve 34 is scattered by the air flow. The scattered developer moves along a flow of the air flow.

Here, in the case where a closest distance between the second developing roller 31 and the guiding member 45 is B and a closest distance between the peeling roller 32 and the guiding member 45 is C, the flow of the air flow is influenced by a relationship between the closest distances B and C. The closest distance B is a closest distance between the second developing roller 31 and a free end Z of the guiding member 45. The air flow is liable to flow toward a large gap, and therefore, when the above-described relationship between the closest distances B and C is B≥C, the scattered developer is carried along with the air flow in a direction toward a gap B1 between the second developing roller 31 and the guiding member 45. The developer carried in the direction toward the gap B1 between the second developing roller 31 and the guiding member 45 passes through this gap B1 and is then dropped. The first developing roller 30 is disposed at a position overlapping with the gap B1 between the second developing roller 31 and the guiding member 45 with respect to the vertical direction, and therefore, the developer passed through this gap B1 moves in a direction toward the first sleeve 33 of the first developing roller 30.

When the used developer approaches the neighborhood of the first sleeve 33, the used developer is pulled toward the magnetic pole 106 of the first magnet 36 included in the first developing roller 30. As described above, a delivering magnetic field is generated between the magnetic pole 106 of the first magnet 36 included in the first developing roller 30 and the magnetic pole 201 of the second magnet 37 included in the second developing roller 31. For this reason, the above-described used developer moves toward the second developing roller 31 by the delivering magnetic field. That is, the used developer dropped from the surface of the second sleeve 34 is scooped on the second sleeve 34 again, and thus drag occurs, so that an uneven (irregular) image is generated on an output image.

Therefore, in this embodiment, an arrangement of the guiding member 45 and the peeling roller 32 is regulated so that the relationship between B which is the closest distance between the second developing roller 31 and the guiding member 45 and C which is the closest distance between the peeling roller 32 and the guiding member 45 satisfies B<C. A constitution is created so as to satisfy B<C, it is possible to suppress that the used developer scattered from the second developing roller 31 moves to the neighborhood of the closest portion between the first developing roller 30 and the second developing roller 31. As a result, an occurrence of the drag on the second sleeve 34 of the second developing roller 31 is suppressed, so that an occurrence of an image defect such as the uneven image can be suppressed.

Further, in the case where a closest distance between the second developing roller 31 and the peeling roller 32 is A, it is preferable that B<A is satisfied. This will be described. First, an air flow generated in a gap A1 between the second developing roller 31 and the peeling roller 32 includes a component flowing toward a gap B1 between the second developing roller 31 and the guiding member 45 or toward a gap C1 between the peeling roller 32 and the guiding member 45, and a component coming out of the gap A1. A balance between an air flow (in flow amount) flowing in a space surrounded by the gaps A1, B1, and C1 and an air flow (discharge amount) going out of the space is kept. If this balance is not kept and the in flow amount is large, internal pressure continuously increases. Accordingly, the air flow escapes from the gap so as to keep the balance between the inflow amount of the air flow and the discharge amount of the air flow.

In the case where the rotational speeds of the various rollers are constant, a flow rate of the air flow is determined by a magnitude of an associated gap, so that the flow rate increases with a larger gap. Further, the air flow flows toward a large gap decreased in resistance. When a relationship between the closest distance A in the gap A1 and the closest distance B in the gap B1 is considered on the assumption that the closest distance C in the gap C1 and the closest distance B in the gap B1 is B<C, in the case where a relationship of B>A is satisfied, a flow of the air flow toward both the gaps B1 and C1 which are large in gap generates. Further, the gap C1 is larger than the gap B1, and therefore, the air flow flowing in the gap C1 increases in amount, but the air flow flowing in the gap B1 generates in a certain amount.

On the other hand, in the case where a relationship of B<A is satisfied, the gap B1 is narrower than the gap A1, and therefore, the air flow flows in the gap A1 or in the gap C1. Thus, by satisfying B<A in addition to a condition of B<C, the air flow does not readily flow in the gap B1, so that the scattered developer can be suppressed from being carried toward the first developing roller 30 side.

Further, in the above-described relationship between the distances A, B, and C, in this embodiment, it is preferable that A≤C is satisfied. This is because the air flow is made easy to flow from the gap A1 to the gap C1. By employing a relationship: A<C, a flow sending the developer to the developer collecting screw 44 is formed, so that it is possible to suppress that the developer flows in the gap B1. Further, in the case where the air flow flows back from the gap A1, the direction thereof is such that the developer blows out from the developing device, and therefore, leads to scattering of the developer to the outside of the developing device. For this reason, by satisfying A<C, it is possible to suppress the scattering of the developer to the outside of the developing device.

Incidentally, when the flow of the developer to the gap B1 can be suppressed, B<C may only be satisfied, and A>C may be satisfied. However, as described above, in order to make the flow from the gap A1 to the gap C1 easy, A≤C may preferably be satisfied. When the suppression of the scattering of the developer to the outside of the developing device is taken into consideration, it is further preferable that A<C is satisfied. That is, in this embodiment, it is preferable that B<A<C is satisfied, whereby the flow of the air flow can be made a flow such that the developer is efficiently sent to the developer collecting screw 44, and in addition, it is possible to suppress the scattering of the developer to the outside of the developing device.

In the case of this embodiment, for example, the closest distance A between the second developing roller 31 and the peeling roller 32 is 2600 μm, the closest distance B between the second developing roller 31 and the free end Z of the guiding member 45 is 1000 μm, and the closest distance C between the peeling roller 32 and the guiding member 45 is 3000 μm. As described above, the air flow is liable to flow toward the side where the gap is large, and therefore, a relationship between the gaps B1 and Cl is set to satisfy B<C. That is, the air flow generated in the gap A1 by drive of the second developing roller 31 and the peeling roller 32 flows toward the gap C1 between the peeling roller 32 and the guiding member 45 which provide a large gap. By this, the scattered developer is also carried toward the gap C1 along the air flow.

Further, by making the gap B1 between the second developing roller 31 and the free end Z of the guiding member 45 smaller than the gap A1, the air flow is caused to less flow toward the gap B1. In the case where a relationship between the gaps B1 and A1 is A<B, an air flow such that the air flow generated in the gap A1 flows in the gap B1 large in distance is created, so that the scattered developer is carried toward the gap B1.

Accordingly, as in this embodiment, it is preferred to constitute the gaps A1, B1, and C1 so as to satisfy that a relationship between the closest distances A, B, and C is B<A<C, and by satisfying B<A<C, the flow of the air flow can be effectively directed toward the gap C1. As a result of this, the used developer scattered from the second developing roller 31 is suppressed from moving the neighborhood of the closest portion between the first developing roller 30 and the second developing roller 31. By this, it is possible to suppress that the drag occurs on the second sleeve 34 of the second developing roller 31.

In this embodiment, the closest distance A in the gap A1 between the second developing roller 31 and the peeling roller 32 is set to 200 μm as a lower-limit value and to 3500 μm as an upper-limit value. The reason why the lower-limit value of the closest distance A in the gap A1 is set to 200 μm is that in the case where the closest distance A is below 200 μm, there is a liability that the second developing roller 31 and the peeling roller 32 are in contact with each other and thus slide with each other due to a component tolerance, a play, vibration, or the like. On the other hand, the reason why the upper-limit value of the closest distance A in the gap A1 is set to 3500 μm is that in the case where the closest distance A exceeds 3500 μm, there is a liability that the magnetic field generated by cooperation of the magnetic pole 207 in the second magnet 37 with the magnetic pole

303 in the third magnet 38 is weakened and thus efficiency of delivering of the developer from the second sleeve 34 to the third sleeve 35 lowers.

In this embodiment, the closest distance B in the gap B1 between the second developing roller 31 and the guiding member 45 is set to 200 μm as a lower-limit value and to 2000 μm as an upper-limit value. The reason why the lower-limit value of the closest distance B in the gap B1 is set to 200 μm is that in the case where the closest distance A is below 200 μm, there is a liability that the second developing roller 31 and the guiding member 45 are in contact with each other and thus slide with each other due to a component tolerance, a play, vibration, or the like. On the other hand, the reason why the upper-limit value of the closest distance B in the gap B1 is set to 2000 μm will be described in the following. In the case where the closest distance B exceeds 2000 μm, when the air flow generated in the gap A1 between the second developing roller 31 and the peeling roller 32 flows toward the gap B1, a resistance received by the air flow flowing in the gap B1 becomes especially small. As a result of this, the air flow is liable to flow from the gap A1 to the gap B1, so that even in the case where the gap C1 is larger than the gap B1, there is a liability that an amount of the air flow flowing in the gap B1 becomes large.

Further, in this embodiment, a lower-limit value of the closest distance C in the gap C1 between the peeling roller 32 and the guiding member 45 is set to 200 μm, and an upper-limit value of the closest distance C is set to a value larger than the above-described upper-limit value of the closest distance B. The reason why the lower-limit value of the closest distance C in the gap C1 is set to 200 μm is that in the case where the closest distance C is below 200 μm, there is a liability that the peeling roller 32 and the guiding member 45 are in contact with each other and thus slide with each other due to a component tolerance, a play, vibration, or the like.

Further, in the case where the closest distance C is below 200 μm, when the air flow generated in the gap A1 between the second developing roller 31 and the peeling roller 32 flows toward the gap C1, a resistance received by the air flow flowing in the gap C1 becomes especially large. As a result of this, the air flow does not readily flow from the gap A1 to the gap C1, so that there is a liability that the air flow flows back from the gap A1. Here, the set values employed in this embodiment are examples, the relationship between the closest distance B in the gap B1 and the closest distance C in the gap C1 may preferably be that the closest distance C is larger than the closest distance A by 100 μm or more, more preferably 300 μm or more, further preferably 500 μm or more. The relationship between the closest distance A in the gap A1 and the closest distance B in the gap B1 may preferably be that the closest distance A is larger than the closest distance B by 100 μm or more, more preferably 300 μm or more, further preferably 500 μm or more. The relationship between the closest distance A in the gap A1 and the closest distance C in the gap C1 may preferably be that the closest distance A is larger than the closest distance C by 100 μm or more, more preferably 300 μm or more, further preferably 500 μm or more.

As described above, according to this embodiment, in the developing device in which the developer is delivered from the first developing roller 30 to the second developing roller 31, positioned above the first developing roller 30, on the basis of the magnetic force, and then is delivered from the second developing roller 31 to the peeling roller 32 on the basis of the magnetic force again, it is possible to suppress the occurrence of the image defect. That is, with respect to the rotational direction of the second sleeve 34, on a side downstream of the delivering position of the developer between the second developing roller 31 and the peeling roller 32, the used developer dropped from the second sleeve 34 can be suppressed from being conveyed to the delivering portion between the first developing roller 30 and the second developing roller 31 in the neighborhood of the closest position between the first developing roller 30 and the second developing roller 31. By this, the drag of the developer on the first developing roller 30 is also suppressed, so that the developing device 1Y such that even in a region in which the image is formed at a higher speed, the developer is stably collected from the second sleeve 34 and is circulated in the developer circulation portion 46 and then is capable of being supplied to the first sleeve 33, and the image forming apparatus 100 including the developing device 1Y can be provided.

Other Embodiments

The present invention is not limited to the constitution of the above-described embodiment. For example, the image forming apparatus 100 is not limited to the MFP, but may also be a copying machine, a printer, or a facsimile machine. Further, the constitutions of the developer supplying screw 42, the developer stirring screw 43, and the developer collecting screw 44 are not particularly limited when the constitutions can convey the developer, and for example, it is possible to apply a helical blade, a paddle-like blade.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2023-020080 filed on Feb. 13, 2023, and 2024-003031 filed on Jan. 12, 2024, which are hereby incorporated by reference herein in their entirety.

What is claimed is:

1. A developing device comprising:

a first chamber configured to accommodate a developer containing toner and a carrier;

a first feeding screw provided in the first chamber and configured to feed the developer in the first chamber;

a second chamber partitioned from the first chamber by a partition wall;

a second feeding screw provided in the second chamber and configured to feed the developer in the second chamber, the second feeding screw having a rotation center positioned above a rotation center of the first feeding screw in a vertical direction;

a first rotatable member to which the developer is supplied from the first chamber and configured to carry and feed the developer for developing an electrostatic latent image formed on an image bearing member;

a first magnet fixedly provided inside the first rotatable member;

a regulating member which is provided opposed to the first rotatable member and regulates an amount of the developer carried on the first rotatable member;

a second rotatable member which is provided opposed to the first rotatable member, to which the developer is delivered from the first rotatable member by a magnetic field generated by the first magnet, and which is configured to carry and feed the developer for developing the electrostatic latent image, the second rotatable member having a rotation center positioned above a rotation center of the first rotatable member in the vertical direction;

a second magnet fixedly provided inside the second rotatable member;

a third rotatable member which is provided opposed to the second rotatable member, to which the developer is delivered from the second rotatable member by a magnetic field generated by the second magnet, and which is configured to carry and feed the developer for collecting, into the second chamber, the developer after the electrostatic latent image is developed with the developer, the third rotatable member having a rotation center positioned above the rotation center of the second rotatable member in the vertical direction;

a third magnet fixedly provided inside the third rotatable member; and a guiding portion provided opposed to each of the second rotatable member and the third rotatable member and configured to guide the developer, to the second feeding screw, peeled off from the third rotatable member by a repelling magnetic field generated by the third magnet, wherein in a case that a shortest distance between the second rotatable member and the guiding portion is B [μm], and a shortest distance between the third rotatable member and the guiding portion is C [μm], the following relationship is satisfied:

$$B + 100\ \mu m \le C.$$

2. A developing device according to claim 1, wherein the following relationship is satisfied:

$$B + 300\ \mu m \le C.$$

3. A developing device according to claim 1, wherein the following relationship is satisfied:

$$B + 500\ \mu m \le C.$$

4. A developing device according to claim 1, wherein the following relationships are satisfied:

$$200\ \mu m \le B \le 2000\ \mu m, \text{ and}$$

$$200\ \mu m \le C.$$

5. A developing device according to claim 1, wherein in a case that a closest distance between the second rotatable member and the third rotatable member is A [μm], the following relationship is satisfied:

$$B < A.$$

6. A developing device according to claim 5, wherein the following relationship is satisfied:

$$B + 100\ \mu m \le A.$$

7. A developing device according to claim 5, wherein the following relationship is satisfied:

$$B + 300\ \mu m \le A.$$

8. A developing device according to claim 5, wherein the following relationship is satisfied:

$$B + 500\ \mu m \le A.$$

9. A developing device according to claim 5, wherein the following relationships are satisfied:

$$200\ \mu m \le A \le 3500\ \mu m,$$

$$200\ \mu m \le B \le 2000\ \mu m, \text{ and}$$

$$200\ \mu m \le C.$$

10. A developing device according to claim 1, wherein in a case that a closest distance between the second rotatable member and the third rotatable member is A [μm], the following relationship is satisfied:

$$A \le C.$$

11. A developing device according to claim 10, wherein the following relationship is satisfied:

$$A < C.$$

12. A developing device according to claim 11, wherein the following relationship is satisfied:

$$A + 100\ \mu m \le C.$$

13. A developing device according to claim 11, wherein the following relationship is satisfied:

$$A + 300\ \mu m \le C.$$

14. A developing device according to claim 11, wherein the following relationship is satisfied:

$$A + 500\ \mu m \le C.$$

15. A developing device according to claim 10, wherein the following relationship is satisfied:

$$B < A.$$

16. A developing device according to claim 10, wherein the following relationships are satisfied:

$$200\,\mu m \le A \le 3500\,\mu m,$$

$$200\,\mu m \le B \le 2000\,\mu m, \text{ and}$$

$$200\,\mu m \le C.$$

17. A developing device according to claim 1, further comprising a communicating portion configured to permit communication of the developer from the second chamber to the first chamber.

18. A developing device according to claim 1, further comprising:

a third chamber partitioned from the first chamber by another partition wall different from the partition wall;

a third feeding screw provided in the third chamber and configured to feed the developer in the third chamber;

a first communicating portion configured to permit communication of the developer from the third chamber to the first chamber; and a second communicating portion configured to permit communication of the developer from the first chamber to the third chamber.

19. A developing device according to claim 1, wherein in a position where the first rotatable member and the second rotatable member oppose to each other, the second rotatable member rotates in a direction opposite to the first rotatable member.

20. A developing device according to claim 1, wherein when the developing device is viewed in a cross section perpendicular to a rotational axis of the third rotatable member, in a case that of two intersection points where a horizontal line L passing through the rotation center of the third rotatable member crosses the third rotatable member, the intersection point on a side closer to the second feeding screw is an intersection point X and the intersection point on a side remoter from the second feeding screw is an intersection point X', a tangential line M of the third rotatable member passing through the intersection point X crosses the guiding portion.

21. A developing device according to claim 1, wherein when the developing device is viewed in a cross section perpendicular to a rotational axis of the third rotatable member, a perpendicular line H passing through a lowest point Y of the guiding portion does not intersect the third rotatable member.

22. A developing device according to claim 1, wherein when the developing device is viewed in a cross section perpendicular to a rotational axis of the third rotatable member, a perpendicular line N passing through a free end Z of the guiding portion closest to the second rotatable member intersects the third rotatable member.

23. A developing device according to claim 1, wherein in a position where the second rotatable member and the third rotatable member oppose each other, the third rotatable member rotates in a same direction as the second rotatable member.

24. A developing device according to claim 1, wherein the image bearing member is rotatable, and in a position where the image bearing member and the first rotatable member oppose each other, the first rotatable member rotates in a same direction as the image bearing member.

25. A developing device according to claim 1, wherein the image bearing member is rotatable, and in a position where the image bearing member and the second rotatable member oppose each other, the second rotatable member rotates in a same direction as the image bearing member.

26. A developing device according to claim 1, wherein the second feeding screw is positioned below a rotation center of the third rotatable member in the vertical direction.

27. A developing device according to claim 1, wherein the guiding portion is positioned below a rotation center of the third rotatable member in the vertical direction.

28. A developing device according to claim 18, further comprising a developer supply portion configured to supply the developer to the third chamber, wherein the developer supply portion is disposed above the third feeding screw in the vertical direction.

* * * * *